(12) United States Patent
Lisboa Santos et al.

(10) Patent No.: US 11,920,722 B2
(45) Date of Patent: Mar. 5, 2024

(54) INTERVENTION DRIVE SYSTEM COMPRISING AN UMBILICAL

(71) Applicants: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Hugo Francisco Lisboa Santos, Rio de Janeiro (BR); Ney Robinson Salvi Dos Reis, Rio de Janeiro (BR); Maurício Galassi, Rio de Janeiro (BR); Lincoln Homero Thome Ferreira, Rio de Janeiro (BR); Igor Mendes Ursine Krettli, Rio de Janeiro (BR); Hardy Leonardo Da Cunha Pereira Pinto, Rio de Janeiro (BR); Tiago Becker, Porto Alegre (BR); Rafael Antônio Comparsi Laranja, Porto Alegre (BR); Luciana Porcher Nedel, Porto Alegre (BR); Laura Amaya Torres, Porto Alegre (BR); Jose Abel Ticona Larico, Porto Alegre (BR); Jaime Andrés Riascos Salas, Porto Alegre (BR); Gabrielle Almeida De Souza, Porto Alegre (BR); Filipe Paixão Geiger, Porto Alegre (BR); Fabiano Disconzi Wildner, Porto Alegre (BR); Eduardo Antonio Wink De Menezes, Porto Alegre (BR); Eduardo Donadel Basso, Porto Alegre (BR); David Steeven Villa Salazar, Porto Alegre (BR); Eduardo André Perondi, Porto Alegre (BR); Anderson Maciel, Porto Alegre (BR); Dante Augusto Couto Barone, Porto Alegre (BR); Juliano Morato Franz, Halifax (CA)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 173 days.

(21) Appl. No.: 17/288,662

(22) PCT Filed: Oct. 24, 2019

(86) PCT No.: PCT/BR2019/050461
§ 371 (c)(1),
(2) Date: Apr. 26, 2021

(87) PCT Pub. No.: WO2020/082149
PCT Pub. Date: Apr. 30, 2020

(65) Prior Publication Data
US 2021/0396342 A1 Dec. 23, 2021

(30) Foreign Application Priority Data

Oct. 26, 2018 (BR) .......................... 1020180720627

(51) Int. Cl.
*B08B 9/055* (2006.01)
*B08B 9/053* (2006.01)
(Continued)

(52) U.S. Cl.
CPC ............ *F16L 55/46* (2013.01); *B08B 9/0535* (2013.01); *B08B 9/055* (2013.01);
(Continued)

(58) Field of Classification Search
CPC ......... B08B 9/043; B08B 9/047; B08B 9/049; B08B 9/051; B08B 9/0535; B08B 9/055;
(Continued)

(56) References Cited

U.S. PATENT DOCUMENTS

| 4,677,865 A | 7/1987 | Lehmann |
| 5,142,990 A | 9/1992 | Leonard |

(Continued)

FOREIGN PATENT DOCUMENTS

| BR | 0005931 A | 8/2002 |
| CA | 2683355 A1 | 7/2002 |

(Continued)

*Primary Examiner* — Randall E Chin
(74) *Attorney, Agent, or Firm* — Mintz Levin Cohn Ferris Glovsky and Popeo, P.C.

(57) ABSTRACT

The present invention relates to an intervention drive pig comprising an umbilical. In this scenario, the present invention provides an intervention drive pig comprising an umbilical, wherein the umbilical (6) is manufactured from a (Continued)

low-density material, wherein the umbilical (6) comprises an external covering of material having a low coefficient of friction.

9 Claims, 2 Drawing Sheets

(51) Int. Cl.
*F16L 55/30* (2006.01)
*F16L 55/46* (2006.01)
*F16L 101/12* (2006.01)

(52) U.S. Cl.
CPC ... *B08B 2209/045* (2013.01); *B08B 2209/055* (2013.01); *F16L 55/30* (2013.01); *F16L 2101/12* (2013.01)

(58) Field of Classification Search
CPC ......... B08B 2209/045; B08B 2209/055; F16L 55/30; F16L 55/32; F16L 55/46; F16L 2101/12
See application file for complete search history.

(56) References Cited

U.S. PATENT DOCUMENTS

| | | |
|---|---|---|
| 5,272,986 A | 12/1993 | Smart |
| 5,565,633 A | 10/1996 | Wernicke |
| 9,662,691 B2 | 5/2017 | Lund |
| 2007/0000406 A1 | 1/2007 | Stout |

FOREIGN PATENT DOCUMENTS

| | | | |
|---|---|---|---|
| EP | 0754902 B1 | | 5/2003 |
| GB | 2377000 A | | 12/2002 |
| WO | 9807532 A1 | | 2/1998 |
| WO | WO 2005/084833 A1 | * | 9/2005 |
| WO | 2010139943 A2 | | 12/2010 |

* cited by examiner

INTERVENTION DRIVE SYSTEM COMPRISING AN UMBILICAL

CROSS-REFERENCE TO RELATED APPLICATIONS

This application is a U.S. national phase filing under 35 U.S.C. § 371 of International Application No. PCT/BR2019/050461, filed Oct. 24, 2019 and claims priority to Brazilian Application No. BR 102018072062-7, filed Oct. 26, 2018. The entire contents of the prior applications are incorporated herein by reference in their entity.

FIELD OF THE INVENTION

The present invention relates to pipeline cleaning technologies. More particularly, the present invention relates to an intervention drive pig comprising an umbilical cable.

BACKGROUND OF THE INVENTION

The production of petroleum from offshore wells almost always involves the drilling of wells and the interconnection thereof with a stationary production unit (SPU). This interconnection is normally executed by means of rigid pipelines and/or flexible pipelines.

SPUs may also be interconnected to other SPUs or, in addition, to onshore stations by means of rigid or flexible pipelines. These pipelines may possibly experience blockages caused, for example, by hydrates and paraffins.

As is widely known in the state of the art, these blockages cause great prejudice to the industry by virtue of the fact that they prevent the continuity of the production from the well or the transfer of the fluids produced.

The utilization of a pig is an efficacious cleaning procedure in pipelines not wholly blocked. However, the utilization of a pig is solely possible in pipelines not wholly blocked by virtue of the fact that the pig is locomoted within the interior of the pipeline due to the pressure differential responsible for the movement of the fluid within the interior thereof.

For this reason, in blocked pipelines, the utilization of pigs for internal cleaning is rendered extremely difficult.

In some situations in the present state of the art flexitubes are applied comprising wound steel drums in the form of a reel and pushed into the interior of the production line.

However, these equipments possess limited scope and are not capable of being displaced in an ascending manner within the production line, in addition to the fact that many platforms are not capable of operating them by virtue of the great weight thereof.

It is known that robotic units having drive capability are utilized in the construction and maintenance of production and injector wells.

However, such units are also not capable of being displaced for kilometers within the interior of a flexible line by virtue of the diverse bends present in this line and, consequently, the high traction necessary for such purpose.

On the basis of this scenario, the solution commonly adopted consists of attempting to deobstruct obstructed production lines from the SPU. In this case different techniques are utilized, such as the depressurization of the line and the injection of solvents. Such techniques may be applied from the SPU, from a probe, or from another installation connected to the line.

However, these techniques are very protracted, in addition to possessing a high cost by virtue of the production time lost and the high daily rates charged for the utilization of the probes. And they are not always successful, replacement of the line being necessary in such a situation.

Furthermore documents are not known directed towards pigs being capable of being displaced in an ascending manner within flexible pipelines.

The document "PIG instrumentado da Petrobras: resultados e perspectives" [Petrobras instrumented pig, results and perspectives], written by Carlos Henrique Francisco de Oliveira and Claudio Soligo Camerini (Petrobras S.A.), simply reveals a drive pig for inspecting risers and special lines. This pig is basically provided with two units, the first being the drive module and the second the inspection module. The drive module functions as a small tractor permitting the inspection module to reach regions of difficult access, overcoming curves and being displaced in the vertical as well as in the horizontal direction, operating furthermore in unconventional conditions. The characteristics of the inspection module will depend on the method of inspection it is desired be utilized. The drive pig is provided with an electric motor and is fed by umbilical cable by means whereof the control thereof and transmission of data from the inspection are also executed.

The document PI0005931A reveals the device composed of two pigs connected by an articulated rod for tubing inspection. The device revealed by this document resolves the problem of conventional pigs when there are great variations in the diameter of the pipelines. The articulation between the pigs permits greater mobility of the assembly in pipelines having accentuated bends.

From that set out above, it is clear that the state of the art comprises pigs capable of being displaced within tubing having curves and drive pigs comprising drive modules to make the pig move within blocked flexible lines.

However, these drive modules do not permit the pig to be displaced along long pipelines having bends, particularly by virtue of the fact of the increase in load generated by the exponential increase, in relation to the distance and the curves traversed, occurring in the forces requiring to be hauled due to the increasing friction between the umbilical cable and the internal part of the pipelines, Flowing therefrom, the state of the art lacks a pig appropriate for deobstructing long blocked pipelines, permitting displacement thereof within tubing having curves and ascending sections.

As shall be set out in greater detail below, the present invention has the intention of providing, in a practical and efficient manner, the solution to the problems in the aforedescribed state of the art.

SUMMARY OF THE INVENTION

A first object of the present invention is that of the provision of an intervention drive pig capable of being utilized, for example, in ascending sections of flexible pipelines, and in flexible pipelines of great length.

In order to achieve the aforedescribed objects, the present invention provides an intervention drive pig comprising an umbilical cable, wherein the same (6) is manufactured from a low density material, and wherein the umbilical (6) comprises an external covering of material having a low coefficient of friction.

BRIEF DESCRIPTION OF THE DRAWINGS

The detailed description provided below makes reference to the appended drawings and the respective reference numbers thereof.

DETAILED DESCRIPTION OF THE INVENTION

In a preliminary manner it is emphasized that the following description shall be based upon a preferential embodiment of the invention. However, as shall be obvious to any person skilled in the art the invention is not limited to this particular embodiment.

Figure 1:
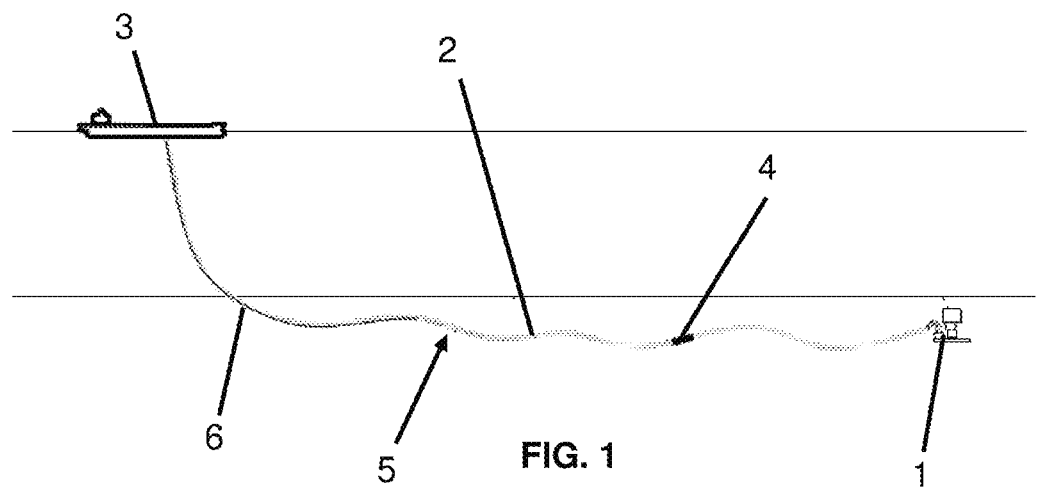
FIG. 1 illustrates schematically a system of production of petroleum wherein the present invention may be applied.

FIG. 1 illustrates schematically a system of production of petroleum wherein the present invention may be applied. In a general manner, the system comprises an SPU 3 connected to a well 1 by means of a flexible pipeline 2. There is also schematically illustrated a drive pig 5 connected to the SPU by means of an umbilical 6, according to an optional configuration of the present invention.

Figure 2:
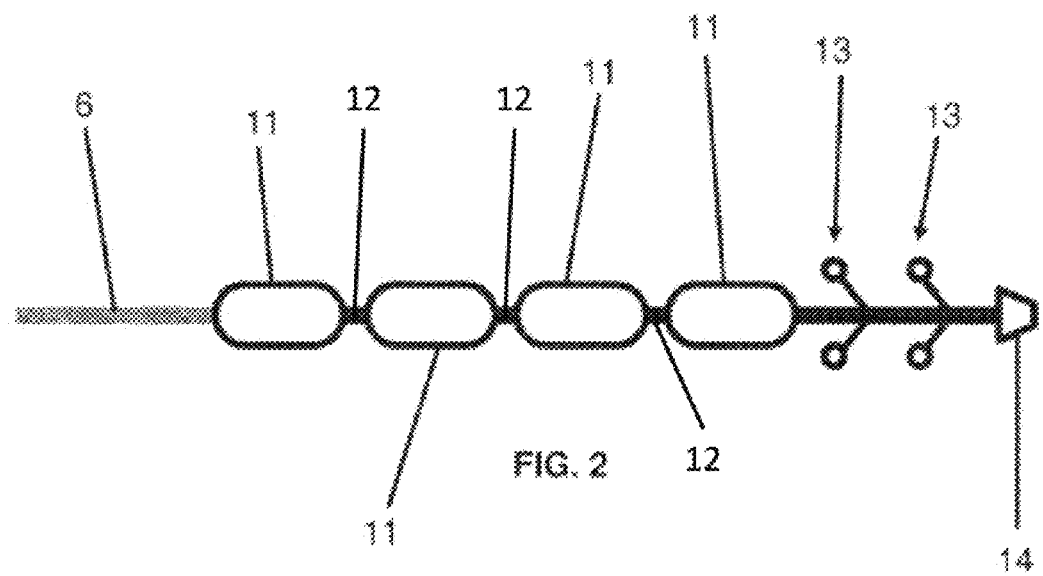
FIG. 2 illustrates a schematic view of a drive pig according to an optional configuration of the present invention.

FIG. 2 illustrates a schematic view of a drive pig 5 according to an optional configuration of the present invention.

According to the most general configuration of the present invention, the intervention drive pig 5 comprises an umbilical 6, wherein the umbilical 6 possesses low density, and wherein the umbilical 6 comprises an external covering of material having a low coefficient of friction. Preferentially, the equivalent density of the umbilical 6 is a density proximate to the average density wherein it is applied.

In general, the umbilical is inserted into a mixture of water, oil and gas, consequently the density thereof must be proximate to the density of this mixture. In other words, the umbilical must be manufactured in a material the density whereof is proximate to the density of the medium inserted within the interior of the pipeline.

One of the great limitations of the current technologies consists in the significant increase in the effects of drag of the umbilical 6 occasioned by the realization of successive curves and influenced by the load hauled. This increase may be estimated by means of the Euler-Eytelwein formula, according whereto the force necessary to drive the umbilical 6, together with the pig 5, increases exponentially with the number of curves traversed.

In order to compensate for this increase, the umbilical 6 connected to the drive pig 5 of the present invention is manufactured in material having a low density, such as hollow microspheres. In this manner it is ensured that the same comprises a neutral density (or proximate to neutral density) in relation to the fluid wherein it is immersed.

In addition, by virtue of the fact that the umbilical 6 receives a covering containing in the composition thereof having a low coefficient of friction with respect to steel, such as, for example, graphite, polyvinylidene fluoride (PVDF), polytetrafluoroethylene (PTFE), and molybdenum disulphide, the resistance thereof to movement is diminished further more.

Figure 3:
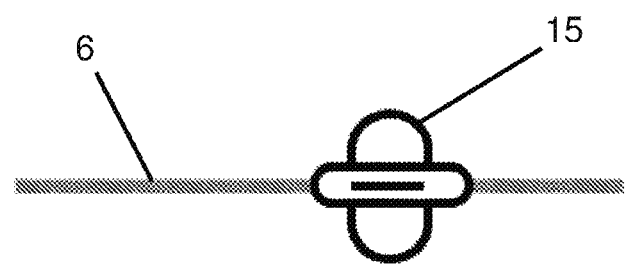
FIG. 3 illustrates a schematic view of an optional configuration of the umbilical of the drive pig of the present invention.

FIG. 3 illustrates a schematic view of an optional configuration of the umbilical 6 of the drive pig 5 of the present invention, wherein the umbilical 6 comprises at least a buoyant centralizer 15. This configuration may be adopted to intensify the characteristic of neutral density of the umbilical 6.

The buoyant centralizer 15 may be manufactured from a material of low density (or else comprise floats), this conferring a neutral buoyancy upon the centralizer/umbilical assembly 15/6.

In this manner, the drive pig 5 of the present invention may be used in long sections of flexible pipelines 2 without a great force being required to move it, by virtue of the fact that the weight thereof will be balanced by the buoyancy of the umbilical 6 and that the friction generated will not excessively increase thanks to the materials employed having a low coefficient of friction.

Consequently, the drive pig 5 of the present invention may be used to remove obstructions and/or to realize a series of operations and maintenance in long sections of pipelines 2, rigid or flexible, ascending, horizontal or descending, and having a large number of bends. Optionally, the drive pig 5 is supplied and controlled from the SPU 3 by means of the umbilical 6.

Figure 4:
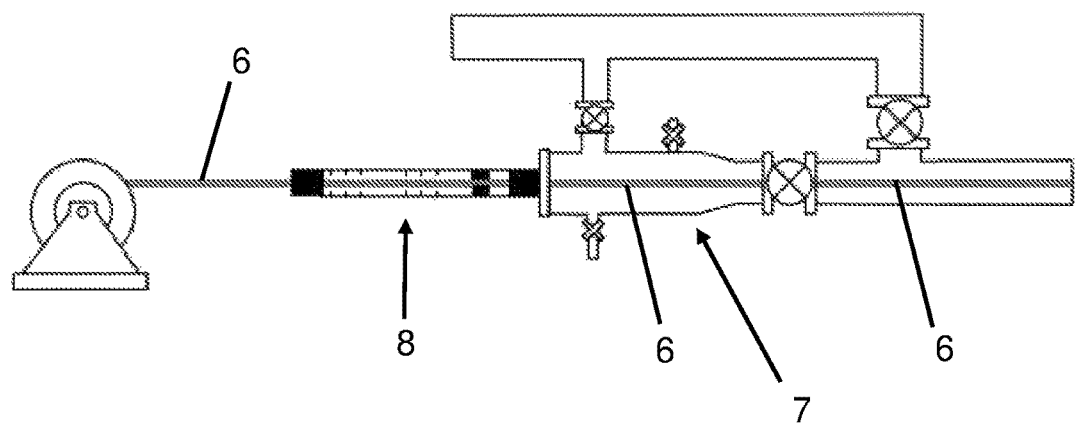
FIG. 4 illustrates a schematic view of a pig launcher/receiver, whereinto the drive pig of the present invention may be inserted.

FIG. 4 shows a schematic view of a pig launcher/receiver 7 wherein the drive pig 5 of the present invention may be inserted. The present invention provides that the drive pig 5 may be inserted in a pig launcher/receiver 7 of the SPU 3 in order to be inserted into a rigid or flexible pipeline 2.

Figure 5:
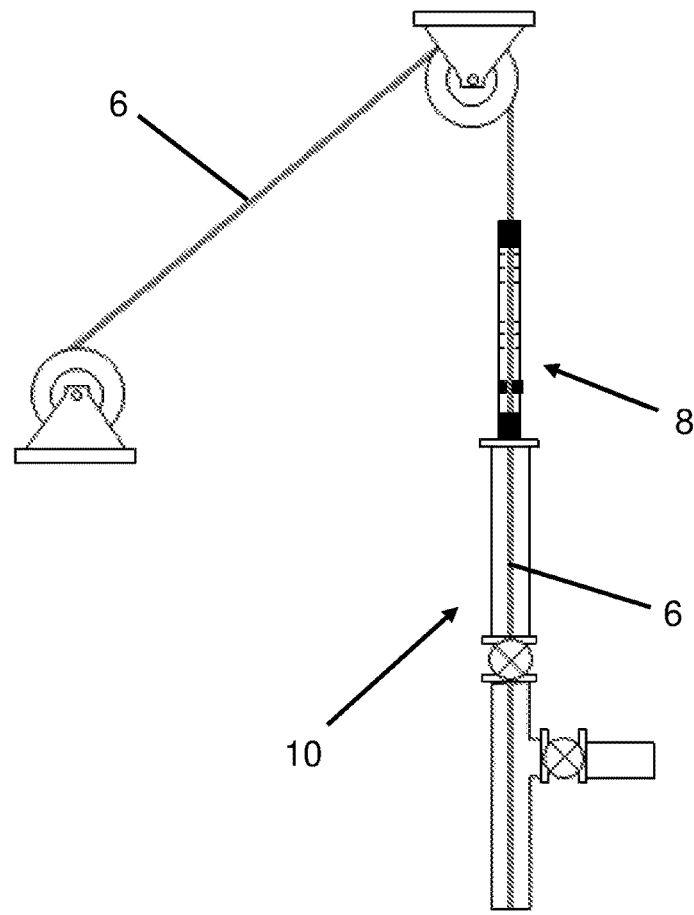
FIG. 5 illustrates a schematic view of a direct vertical trap of an SPU, whereinto the drive pig of the present invention may be inserted.

FIG. 5 illustrates a schematic view of a direct vertical trap 10 of an SPU 3, wherein the drive pig 5 of the present invention may be inserted. In the same manner, this may be the manner adopted to insert the drive pig 5 of the present invention into a flexible (or rigid) pipeline requiring repair.

In both configurations, a sealing device 8 is adopted in order to permit the access of the pig 5 into the pipeline 2. This seal may be static or dynamic, consequently it does not represent a limitation upon the scope of the present invention.

Optionally, the drive pig 5 furthermore comprises at least one drive element 13 to assist the movement of the pig 5 and of the umbilical 6 within the pipeline 2 and/or the well 1. The drive element 13 may adopt a series of strategies to move the pig 5, such as the utilization of wheels, peristaltic movement, and a helical movement.

The position of the drive assembly 13 may be defined at the extremity of the umbilical 6. In this manner it would assist even further in the solution of the problem of surmounting ascending sections of the flexible pipeline 2.

Optionally, the drive pig 5 may be composed of more than one module 11, wherein each module 11 is connected to the adjacent module by an articulated coupler 12. In this manner, the drive pig 5 of the present invention will also have the facility to surmount sections of the pipeline 2 having curves of small radius of curvature.

When this configuration is adopted, each module 11 may be utilized to accommodate diverse electronic elements.

Alternatively, the drive pig 5 may comprise a single flexible module the length whereof may be variable. This configuration will also render possible the displacement of the pig 5 within the interior of a flexible pipeline 2 presenting curves.

On the basis of that set out, it is clear that the invention solves the problems of the state of the art as it proposes to do on providing a drive pig 5 comprising an umbilical 6 having neutral density and low coefficient of friction, permitting that the pig 5 may be utilized, for example, in ascending sections of flexible pipelines 2.

In addition, by virtue of the aforestated diverse optional characteristics thereof, the drive pig 5 of the invention is also capable of being displaced in an efficacious manner within the interior of flexible pipelines 2 comprising long sections having bends.

Consequently, the drive pig 5 of the invention may be applied in a wide diversity of operations of maintenance in ascending sections of flexible lines 2 and in long sections of these lines 2 having curves, this not being achieved satisfactory by the present state of the art. The operations wherein the drive pig 5 may be applied involve: operations of hydrate removal, operations of paraffin removal, and operations of lodged pig removal, inter alia others deemed to be necessary.

The technology described in the present memorandum is principally applied to, however not being limited to, lines 2 possessing a direct vertical trap 10 or, furthermore, a pig launcher/receiver 7. In those cases wherein these elements are not present in the line 2, an adaptation of the lines from the SPU 3 may be realized in order to permit access to the interior thereof.

Innumerable variations affecting the scope of protection of the present application are permissible. In this manner, the fact is emphasized that the present invention is not limited to the aforedescribed specific configurations/embodiments.

The invention claimed is:

1. An intervention drive pig comprising an umbilical comprising a first material of low density and wherein the umbilical comprises an external covering of a second material of low coefficient of friction, wherein the second material comprises polyvinylidene fluoride (PVDF) or molybdenum disulphide.

2. The drive pig, as claimed in claim 1, wherein the umbilical comprises a density proximate to a medium wherein the umbilical is applied, wherein the umbilical is manufactured utilizing the material of low density.

3. The drive pig, as claimed in claim 2, wherein the second material having a low coefficient of friction with steel.

4. The drive pig, as claimed in claim 1, wherein the umbilical comprises at least one buoyant centralizer, wherein the at least one buoyant centralizer confers upon the umbilical a density proximate to a medium wherein it is applied.

5. The drive pig, as claimed in claim 1, further comprising at least one drive element to permit movement of the pig and of the umbilical.

6. The drive pig, as claimed in claim 5, wherein the drive element comprises wheels, a peristaltic movement device, or helical movement device.

7. The drive pig, as claimed in claim 5, wherein the drive element is located at an end of the drive pig opposite the umbilical.

8. The drive pig, as claimed in claim 1, further comprising more than one module, wherein each module is connected to an adjacent module by an articulated coupler.

9. The drive pig, as claimed in claim 1, further comprising a single flexible module.

* * * * *